(12) United States Patent
Op De Beeck et al.

(10) Patent No.: US 7,764,827 B2
(45) Date of Patent: Jul. 27, 2010

(54) MULTI-VIEW IMAGE GENERATION (75) Inventors: Marc Joseph Rita Op De Beeck, Eindhoven (NL); Fabian Edgar Ernst, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1040 days.

(21) Appl. No.: 10/567,205

(22) PCT Filed: Jul. 28, 2004

(86) PCT No.: PCT/IB2004/051315
§ 371 (c)(1),
(2), (4) Date: Feb. 3, 2006

(87) PCT Pub. No.: WO2005/013623
PCT Pub. Date: Feb. 10, 2005

(65) Prior Publication Data
US 2006/0232666 A1    Oct. 19, 2006

(30) Foreign Application Priority Data
Aug. 5, 2003    (EP)    ................... 03102431

(51) Int. Cl.
*G06K 9/00*    (2006.01)
(52) U.S. Cl. .................. 382/154; 345/611; 345/581; 345/589
(58) Field of Classification Search ................ 382/154; 345/611, 589, 581
See application file for complete search history.

(56) References Cited

U.S. PATENT DOCUMENTS 6,031,564 A    2/2000    Ma et al.
6,201,566 B1    3/2001    Harada et al.
6,477,267 B1    11/2002    Richards (Continued)

FOREIGN PATENT DOCUMENTS

WO    9912127 A1    3/1999

(Continued)

OTHER PUBLICATIONS

Pardas M. Video Object Segmentation Introducing Depth and Motion Information, IEEE ICIP Oct. 1998, pp. 637-641, XP010308523.

(Continued)

*Primary Examiner*—Matthew C Bella
*Assistant Examiner*—Mike Rahmjoo (57) ABSTRACT

A multi-view image generation unit (100) for generating a multi-view image on basis of an input image is disclosed. The generation unit (100) comprises: edge detection means (102) for detecting an edge in the input image; depth map generation means (104) for generating a depth map for the input image on basis of the edge, a first group of elements of the depth map corresponding to the edge having a first depth value, related to a viewer of the multi-view image, and a second group of elements of the depth map corresponding to a region of the input image, being located adjacent to the edge, having a second depth value, related to the viewer of the multi-view image, the first value being less than the second value; and rendering means (106) for rendering the multi-view image on basis of the input image and the depth map.

8 Claims, 7 Drawing Sheets

U.S. PATENT DOCUMENTS

2004/0105573 A1* 6/2004 Neumann et al. ............ 382/103
2005/0031166 A1* 2/2005 Fujimura et al. ............ 382/103

FOREIGN PATENT DOCUMENTS

| WO | 9930280 A1 | 6/1999 |
| WO | WO9930280 | 6/1999 |
| WO | 02095680 A1 | 11/2002 |
| WO | WO02095680 A1 | 11/2002 |
| WO | 03005727 A1 | 1/2003 |
| WO | WO03005727 A1 | 1/2003 |

OTHER PUBLICATIONS

ISR, Written Opinion of the International Searching Authority PCT/IB2004/051315, Dec. 2004.

* cited by examiner

MULTI-VIEW IMAGE GENERATION

The invention relates to a multi-view image generation unit for generating a multi-view image on basis of an input image.

The invention further relates to an image processing apparatus comprising:
- receiving means for receiving a signal corresponding to an input image; and
- such a multi-view image generation unit for generating a multi-view image on basis of the input image.

The invention further relates to a method of generating a multi-view image on basis of an input image.

The invention further relates to a computer program product to be loaded by a computer arrangement, comprising instructions to generate a multi-view image on basis of an input image, the computer arrangement comprising processing means and a memory.

In order to generate a 3D impression on a multi-view display device, images from different virtual view points have to be rendered. This requires either multiple input views or some 3D or depth information to be present. This depth information can be either recorded, generated from multiview camera systems or generated from conventional 2D video material. For generating depth information from 2D video several types of depth cues can be applied: such as structure from motion, focus information, geometric shapes and dynamic occlusion. The aim is to generate a dense depth map, i.e. per pixel a depth value. This depth map is subsequently used in rendering a multi-view image to give the viewer a depth impression. In the article "Synthesis of multi viewpoint images at non-intermediate positions" by P. A. Redert, E. A. Hendriks, and J. Biemond, in Proceedings of International Conference on Acoustics, Speech, and Signal Processing, Vol. IV, ISBN 0-8186-7919-0, pages 2749-2752, IEEE Computer Society, Los Alamitos, Calif., 1997 a method of extracting depth information and of rendering a multi-view image on basis of the input image and the depth map are disclosed.

A disadvantage of the cited method is that often the depth map creation does not result in appropriate results, eventually resulting in unsatisfying depth impression.

It is an object of the invention to provide a multi-view image generation unit of the kind described in the opening paragraph which is arranged to render multi-view images with perceptually convincing depth impression on basis of relatively limited depth information.

This object of the invention is achieved in that the generation unit comprises:
- edge detection means for detecting an edge in the input image;
- depth map generation means for generating a depth map for the input image on basis of the edge, a first group of elements of the depth map corresponding to the edge having a first depth value, related to a viewer of the multi-view image, and a second group of elements of the depth map corresponding to a region of the input image, being located adjacent to the edge, having a second depth value, related to the viewer of the multi-view image, the first value being less than the second value; and
- rendering means for rendering the multi-view image on basis of the input image and the depth map.

As a consequence, the performed rendering of the multi-view image is in such a way that an edge is perceived as being closer to the viewer than the surrounding area, i.e. a depth difference on an edge is created. From a human perception point of view the edge appears to belong to a foreground object. So, locally the depth ordering seems such that the foreground object is indeed in front of the background. The inventors have observed that human perception then integrates this very limited and partial depth information to a complete depth impression.

It should be noted that an edge is not necessarily mean a transition of 1 pixel wide. It might be a soft-edge extending over a number of pixels.

In an embodiment of the multi-view image generation unit according to the invention the edge detection means are arranged to detect the edge by computing pixel value differences between first pixel values of the input image and respective second pixel values of a second input image, the input image and the second input image belonging to a sequence of video images. Detecting an edge on basis of subtracting subsequent images of a sequence of video images is relatively easy. An advantage of this embodiment is that a real-time implementation can be realized with relatively simple computing resources. The pixel values represent visible information like color or luminance.

In an embodiment of the multi-view image generation unit according to the invention, being arranged to detect the edge by computing pixel value differences, the first depth value is a function of a first one of the pixel value differences. In other words, the computed pixel value difference is used to determine the depth value. Preferably, the computed pixel value difference is proportional to the depth value. Optionally, filtering is applied on the intermediate result of the computation of pixel value differences. The filtering might includes spatial, temporal or spatio-temporal low-pass filtering. Alternatively, a threshold is used to filter out pixel value differences which are relatively low. These relatively low pixel value differences are then interpreted as noise.

In an embodiment of the multi-view image generation unit according to the invention, the edge detection means are arranged to detect the edge on basis of a motion vector field being computed on basis of the input image and a second input image, the input image and the second input image belonging to a sequence of video images. Preferably, the edge detection means are arranged to detect the edge by means of computing motion vector differences of neighboring motion vectors of the motion vector field. Computing motion vector fields is a common technique known for e.g. video compression, de-interlacing or temporal up-conversion. Typically, discontinuities in a motion vector field, i.e. relatively large differences between adjacent motion vectors of the motion vector field correspond with borders of moving objects in the scene being captured, hence to relevant edges. An advantage of this embodiment according to the invention is that it is arranged to discriminate between different type of edges: edges belonging to substantially stationary objects and edges belonging to moving objects. Especially, the latter type of edges are relevant because these edges typically correspond to foreground objects.

In an embodiment of the multi-view image generation unit according to the invention, being arranged to detect the edge on basis of a motion vector field, the first depth value is a function of a first one of the motion vector differences. In other words, the computed motion vector difference is used to determine the depth value. Preferably, the computed motion vector differences is proportional to the depth value.

It is a further object of the invention to provide an image processing apparatus comprising a multi-view image generation unit of the kind described in the opening paragraph which is arranged to render multi-view images with perceptually convincing depth impression on basis of relatively limited depth information.

This object of the invention is achieved in that the generation unit comprises:

edge detection means for detecting an edge in the input image;

depth map generation means for generating a depth map for the input image on basis of the edge, a first group of elements of the depth map corresponding to the edge having a first depth value, related to a viewer of the multi-view image, and a second group of elements of the depth map corresponding to a region of the input image, being located adjacent to the edge, having a second depth value, related to the viewer of the multi-view image, the first value being less than the second value; and rendering means for rendering the multi-view image on basis of the input image and the depth map.

Optionally, the image processing apparatus further comprises a multi-view display device for displaying the multi-view image.

It is a further object of the invention to provide a method of the kind described in the opening paragraph, to render multi-view images with perceptually convincing depth impression on basis of relatively limited depth information.

This object of the invention is achieved in that the method comprises:

detecting an edge in the input image;

generating a depth map for the input image on basis of the edge, a first group of elements of the depth map corresponding to the edge having a first depth value, related to a viewer of the multi-view image, and a second group of elements of the depth map corresponding to a region of the input image, being located adjacent to the edge, having a second depth value, related to the viewer of the multi-view image, the first value being less than the second value; and rendering the multi-view image on basis of the input image and the depth map.

It is a further object of the invention to provide a computer program product of the kind described in the opening paragraph, to render multi-view images with perceptually convincing depth impression on basis of relatively limited depth information.

This object of the invention is achieved in that the computer program product, after being loaded, provides said processing means with the capability to carry out:

detecting an edge in the input image;

generating a depth map for the input image on basis of the edge, a first group of elements of the depth map corresponding to the edge having a first depth value, related to a viewer of the multi-view image, and a second group of elements of the depth map corresponding to a region of the input image, being located adjacent to the edge, having a second depth value, related to the viewer of the multi-view image, the first value being less than the second value; and rendering the multi-view image on basis of the input image and the depth map.

Modifications of the multi-view image generation unit and variations thereof may correspond to modifications and variations thereof of the image processing apparatus, the method and the computer program product, being described.

These and other aspects of multi-view image generation unit, of the image processing apparatus, of the method and of the computer program product, according to the invention will become apparent from and will be elucidated with respect to the implementations and embodiments described hereinafter and with reference to the accompanying drawings, wherein.

Same reference numerals are used to denote similar parts throughout the figures.

Figure 1:
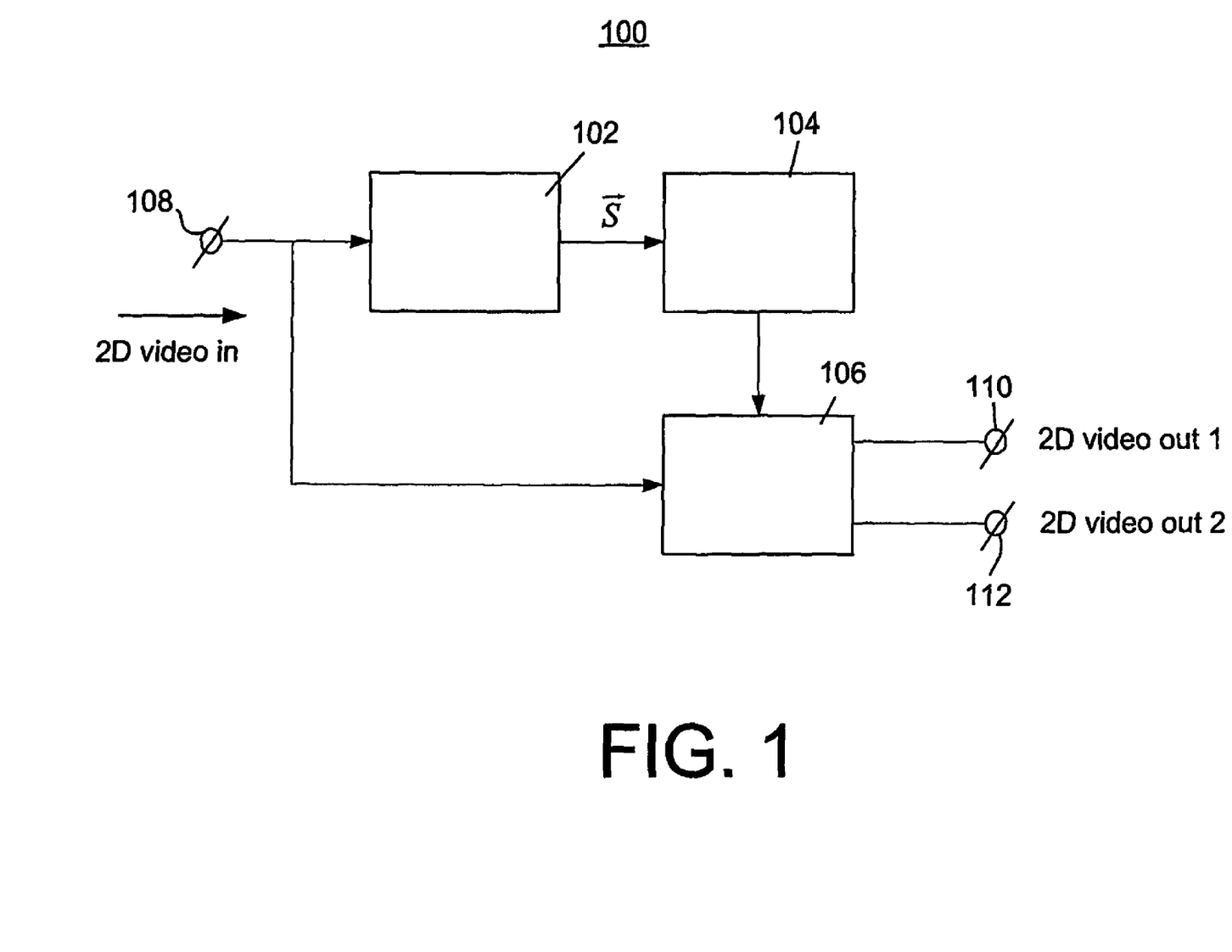
FIG. 1 schematically shows an embodiment of the multi-view image generation unit according to the invention.
Figure 3:
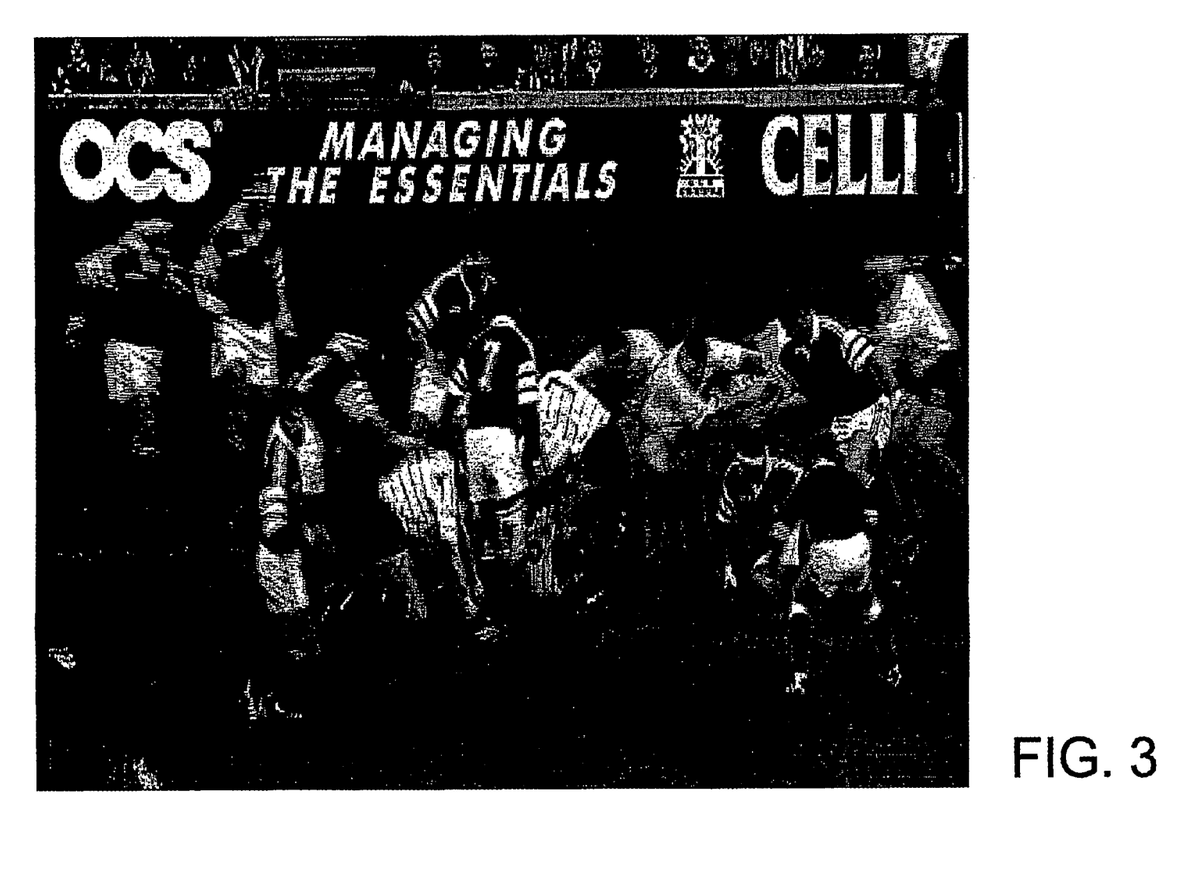
FIG. 3 schematically shows an input image of a sequence of video images.

FIG. 1 schematically shows an embodiment of the multi-view image generation unit 100 according to the invention. The multi-view image generation unit 100 is arranged to generate a sequence of multi-view images on basis of a sequence of video images. FIG. 3 schematically shows an input image of the sequence of video images. The multi-view image generation unit 100 is provided with a stream of video images at the input connector 108 and provides two correlated streams of video images at the output connectors 110 and 112, respectively. These two correlated streams of video images are to be provided to a multi-view display device which is arranged to visualize a first series of views on basis of the first one of the correlated streams of video images and to visualize a second series of views on basis of the second one of the correlated streams of video images. If a user observes the first series of views by his left eye and the second series of views by his right eye he notices a 3D impression. It might be that the first one of the correlated streams of video images corresponds to the sequence of video images as received and that the second one of the correlated streams of video images is rendered on basis of the sequence of video images as received. Preferably, both streams of video images are rendered on basis of the sequence of video images image as received. The rendering is e.g. as described in the article "Synthesis of multi viewpoint images at non-intermediate positions" by P. A. Redert, E. A. Hendriks, and J. Biemond, in Proceedings of International Conference on Acoustics, Speech, and Signal Processing, Vol. IV, ISBN 0-8186-7919-0, pages 2749-2752, IEEE Computer Society, Los Alamitos, Calif., 1997. Alternatively, the rendering is as described in "High-quality images from 2.5D video", by R. P. Berretty and F. E. Ernst, in Proceedings Eurographics, Granada, 2003, Short Note 124.

The multi-view image generation unit 100 comprises:

an edge detection unit 102 for detecting edges in input images;

a depth map generation unit 104 for generating depth maps for the respective input images on basis of the detected edges; and a rendering unit 106 for rendering the multi-view images on basis of the input images and the respective depth maps.

Detecting edges might be based on spatial high-pass filtering of individual input images. However, the edges are preferably detected on basis of mutually comparing multiple input images, in particular computing pixel value differences of subsequent images of the sequence of video images. A first example of the computation of pixel value differences S(x,y,n) is given in Equation 1:

$$S(x,y,n)=|I(x,y,n)-I(x,y,n-1)| \qquad (1)$$

with, I(x,y,n) the luminance value of a pixel with coordinates x and y of image at time n. Alternatively, the pixel value differences S(x,y,n) are computed on basis of color values:

$$S(x,y,n)=|C(x,y,n)-C(x,y,n-1)| \qquad (2)$$

with, C(x,y,n) a color value of a pixel with coordinates x and y of image at time n. In Equation 3 a further alternative is given for the computation of pixel value differences S(x,y,n) based on the three different color components R (Red) G (Green) and B (Blue).

$$S(x,y,n)=\max(|R(x,y,n)-R(x,y,n-1)|,|G(x,y,n)-G(x,y,n-1)|,|B(x,y,n)-B(x,y,n-1)|) \qquad (3)$$

Optionally, the pixel value difference signal $\vec{S}$ is filtered by clipping all pixel value differences which are below a predetermined threshold, to a constant e.g. zero. Optionally, a morphologic filter operation is applied to remove all spatially small edges. Morphologic filters are common non-linear image processing units. See for instance the article "Low-level image processing by max-min filters" by P. W. Verbeek, H. A. Vrooman and L. J. van Vliet, in "Signal Processing", vol. 15, no. 3, pp. 249-258, 1988.

After the computation of the filtered pixel value difference signal $\vec{S}_F$ the depth map is determined. This is specified in Equation 4:

$$D(x,y,n)=F(S_F(x,y,n)) \qquad (4)$$

with D(x,y,n) the depth value of a pixel with coordinates x and y of image at time n and the function F(j) being a linear or non-linear transformation of a pixel value difference $S_F(x,y,n)$ into a depth value D(x,y,n). This function F(j) might be a simple multiplication of the pixel value difference $S_F(x,y,n)$ with a predetermined constant:

$$D(x,y,n)=\alpha \cdot S_j(x,y,n) \qquad (5)$$

Alternatively, the function F(j) corresponds to a multiplication of the pixel value difference $S_F(x,y,n)$ with a weighting factor W(i) which relates to a spatial distance i between the pixel under consideration and a second pixel in a spatial neighborhood of the pixel under consideration, having a local maximum value. It is assumed that the second pixel is located in the center of the edge.

$$D(x',y',n)=W(x,y,x',y')*S_F(x,y,n) \qquad (6)$$

Figure 5A:
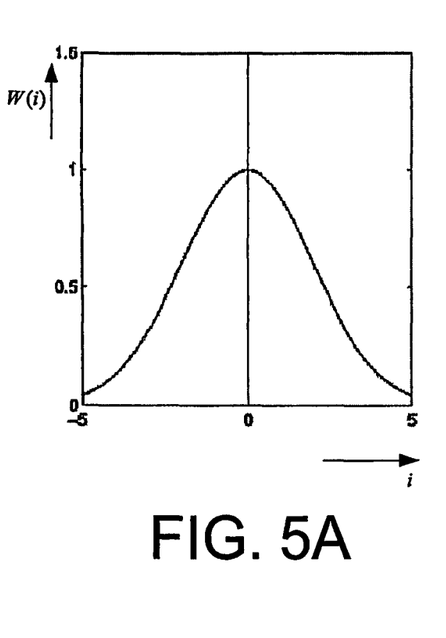
FIG. 5A schematically shows a first function for depth assignment to edges.

FIG. 5A schematically shows a suitable function for depth assignment to edges, i.e. the weighting factor W(i) as function of the spatial distance i.

The result of the operations as described above is that a first group of elements of a particular depth map corresponding to the edge have a first depth value, related to a viewer of the multi-view image, and a second group of elements of the depth map corresponding to a region of a particular input image, being located adjacent to the edge, have a second depth value, related to the viewer of the multi-view image, the first value being less than the second value. Or in other words, the elements of the depth map corresponding to the edge have values which represent a smaller distance to the viewer than the other elements of the depth map.

Figure 4A:
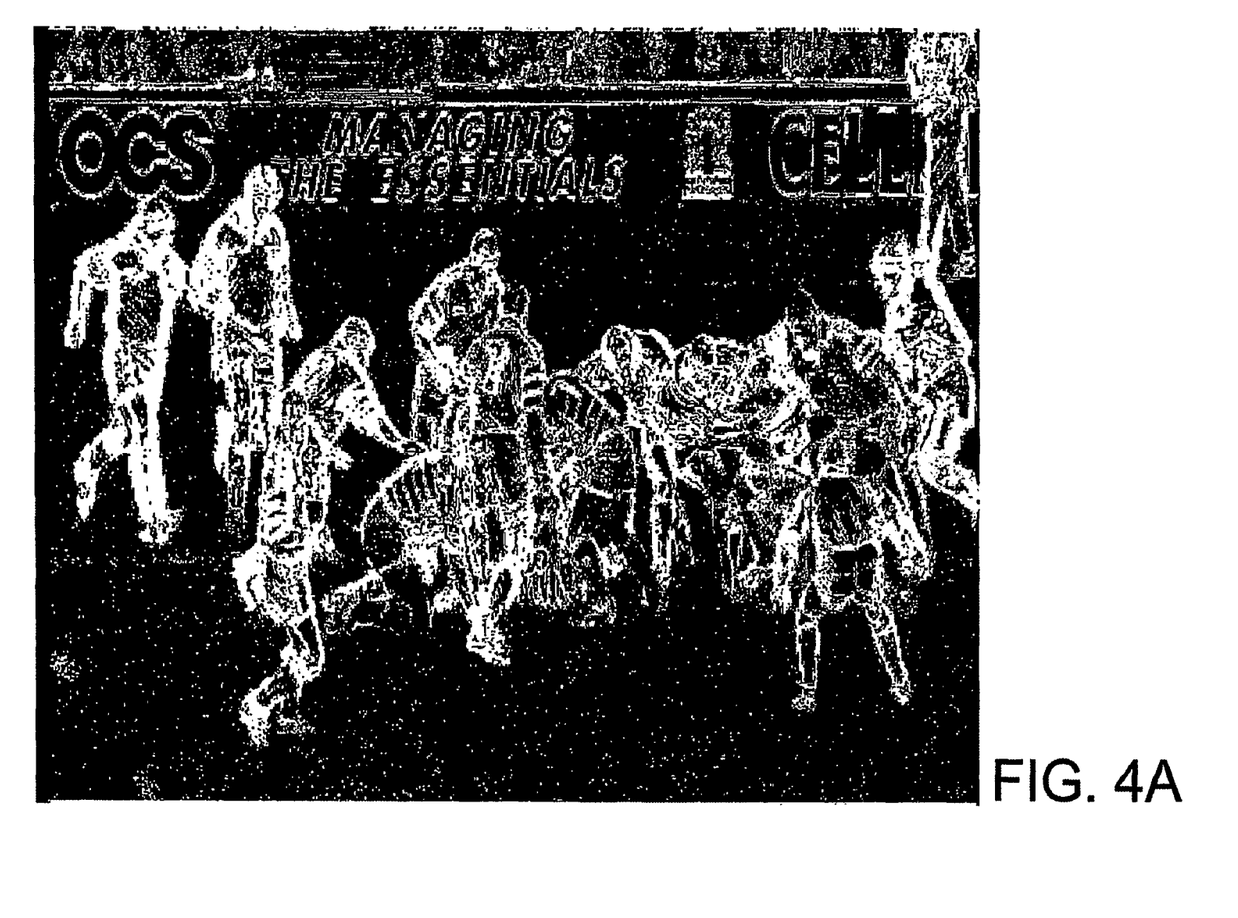
FIG. 4A schematically shows a depth map based on color differences between subsequent input images.

FIG. 4A schematically shows an example of a depth map based on color differences between subsequent input images. This depth map is determined as described above in Equation 2 and 5, however without the filtering.

The edge detection unit 102, the depth map generation unit 104 and the rendering unit 106 may be implemented using one processor. Normally, these functions are performed under control of a software program product. During execution, normally the software program product is loaded into a memory, like a RAM, and executed from there. The program may be loaded from a background memory, like a ROM, hard disk, or magnetically and/or optical storage, or may be loaded via a network like Internet. Optionally an application specific integrated circuit provides the disclosed functionality.

Figure 2:
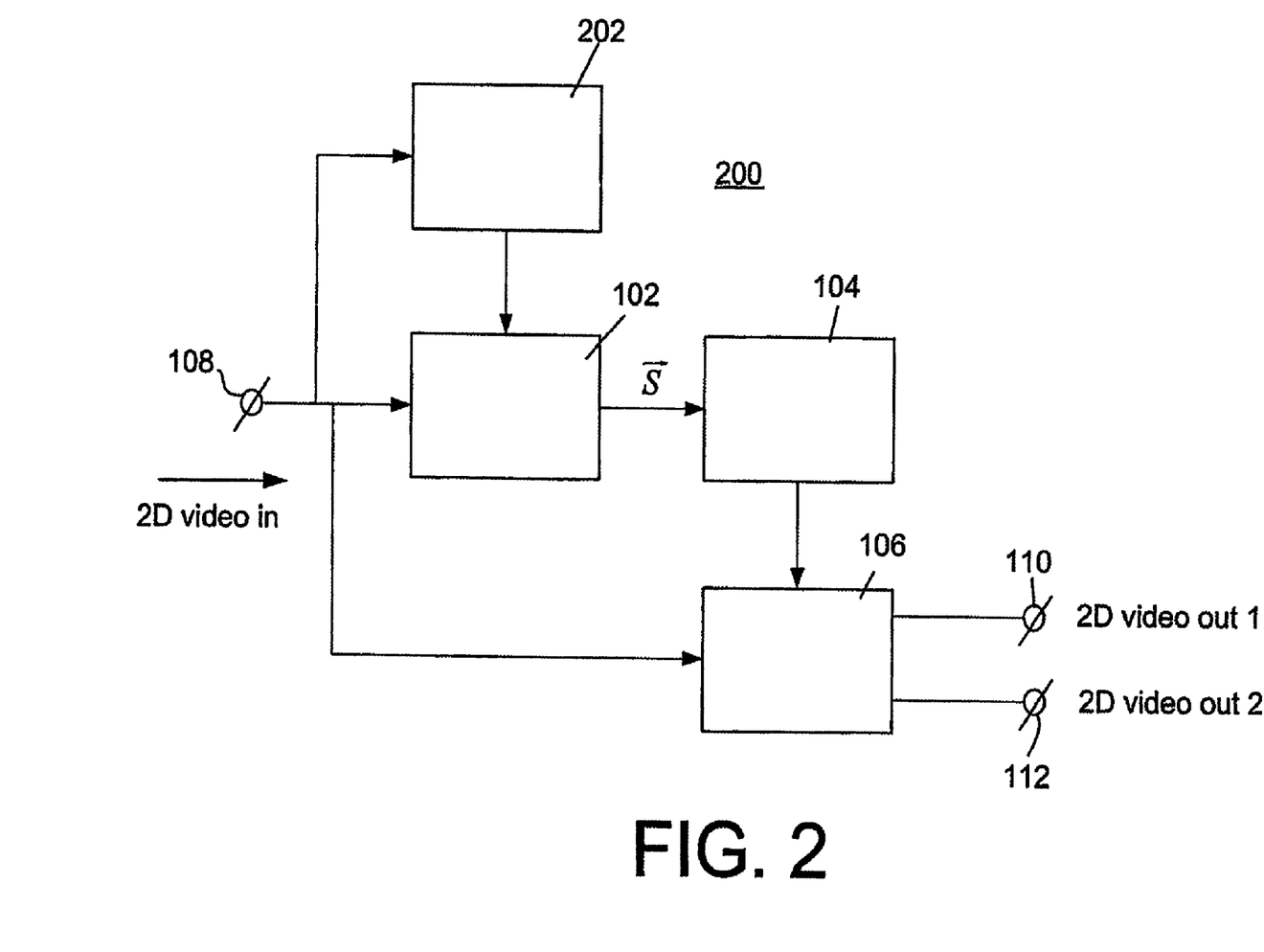
FIG. 2 schematically shows another embodiment of the multi-view image generation unit according to the invention.

FIG. 2 schematically shows another embodiment of the multi-view image generation unit 200 according to the invention. The multi-view image generation unit 200 is arranged to generate a sequence of multi-view images on basis of a sequence of video images. The multi-view image generation unit 200 is provided with a stream of video images at the input connector 108 and provides two correlated streams of video images at the output connectors 110 and 112, respectively. The multi-view image generation unit 200 comprises:

a motion estimation unit 202 for computing motion vector fields of the input images;

an edge detection unit 102 for detecting edges in the input images on basis of the respective motion vector fields;

a depth map generation unit 104 for generating depth maps for the respective input images on basis of the detected edges; and a rendering unit 106 for rendering the multi-view images on basis of the input images and the respective depth maps.

The motion estimation unit 202 is e.g. as specified in the article "True-Motion Estimation with 3-D Recursive Search Block Matching" by G. de Haan et. al. in IEEE Transactions on circuits and systems for video technology, vol. 3, no. 5, October 1993, pages 368-379.

The edge detection unit 102 is provided with motion vector fields as computed by the motion estimation unit 202. The edge detection unit 102 is arranged to determine motion vector field discontinuities. That means that it is arranged to detect regions in the motion vector fields having a relatively large motion vector contrast. These regions correspond with edges in the corresponding image. Optionally the edge detection unit 102 is also provided with pixel values, i.e. color and or luminance values of the input images. By appropriately combining the various inputs segments in the image are achieved. This processing is also described by F. Ernst in "2D-to-3D video conversion based on time-consistent segmentation", in Proceedings of the ICOB (Imersive Communication and Broadcast Systems) workshop, Heinrich-Hertz-Institut, Berlin, January 2003. Besides coordinates of the detected edges of the segments in the images, also topological information of the segments may be provided by the edge detection unit 102. Hence, it may be known which side of the edges belongs to a foreground object and which side of the edge belongs to background.

Figure 4B:
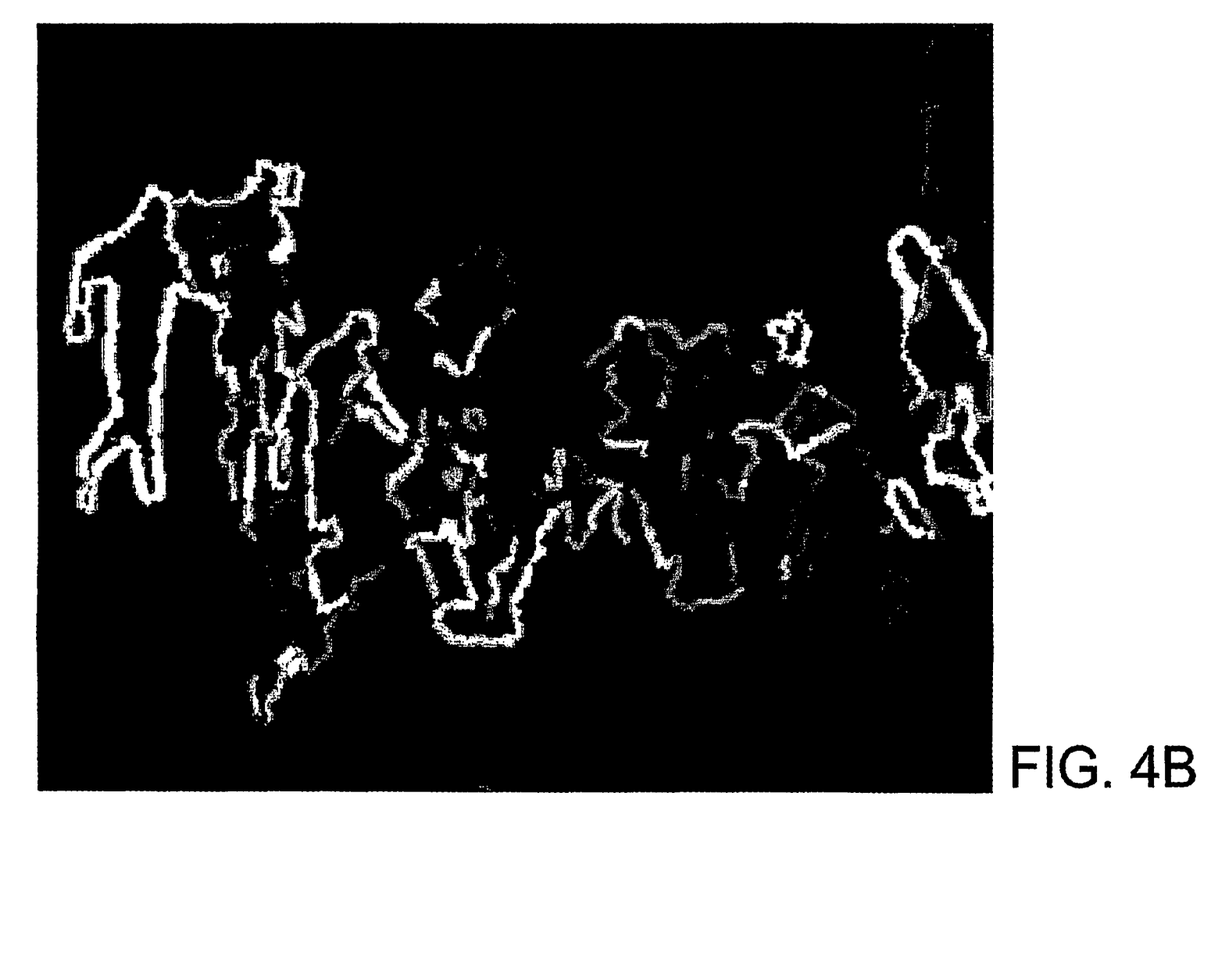
FIG. 4B schematically shows a depth map based on motion discontinuities.
Figure 5B:
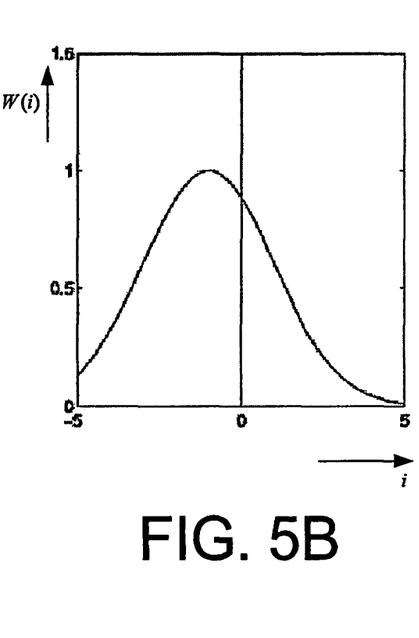
FIG. 5B schematically shows a second function for depth assignment to edges.
Figure 5C:
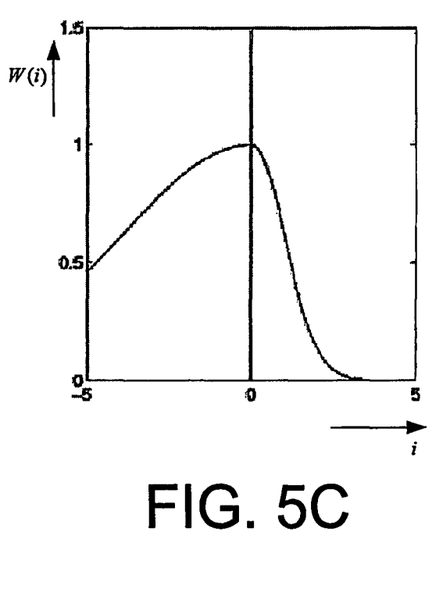
FIG. 5C schematically shows a third function for depth assignment to edges.

After the edge detection, the assignment of depth values is performed. Preferably, the assignment of depth values is based on weighting factors W(i) as depicted in the FIGS. 5B and 5C. In these FIGS. 5B and 5C it is assumed that the left part corresponds to the foreground. FIG. 5B shows asymmetric assignment; the depth jump is biased towards the foreground and FIG. 5C shows skewed assignment; the depth jump falls of more quickly in the background. While symmetric assignment, as depicted in FIG. 5A of the depth around an edge seems to be sufficient for adequate perception, it is preferred that if there is additional depth information, from any other depth cue, this is applied for the assignment of depth values to an edge. The assignment of depth values is preferably slightly biased such that the foreground side of the edge is rendered somewhat more to the front than the background side of the edge. As said above, the edge detection unit 102 is arranged to provide information about the topology of the segments. Hence, it is known which side of the edge belongs to the foreground and which side belongs to the background. FIG. 4B schematically shows a depth map based on motion discontinuities as provided by the depth map generation unit 104 of this embodiment according to the invention.

The motion estimation unit 202, the edge detection unit 102, the depth map generation unit 104 and the rendering unit 106 may be implemented using one processor.

To summarize, the multi-view image generation units 100 and 200 are arranged to render multiple-view images, by means of detecting edges in input images, which are good candidates for depth discontinuities and rendering these images in such a way that the edges are perceived as being closer to the viewer than surrounding areas.

As the depth assignment is primarily based on edge detection it is easy and stable to implement. Especially because the edge detection is relatively easy: based on color, luminance, texture or motion. Preferably, the edges are tracked through time, for instance through time-consistent segmentation, to have the depth assignment per edge more stable over time.

Figure 6:
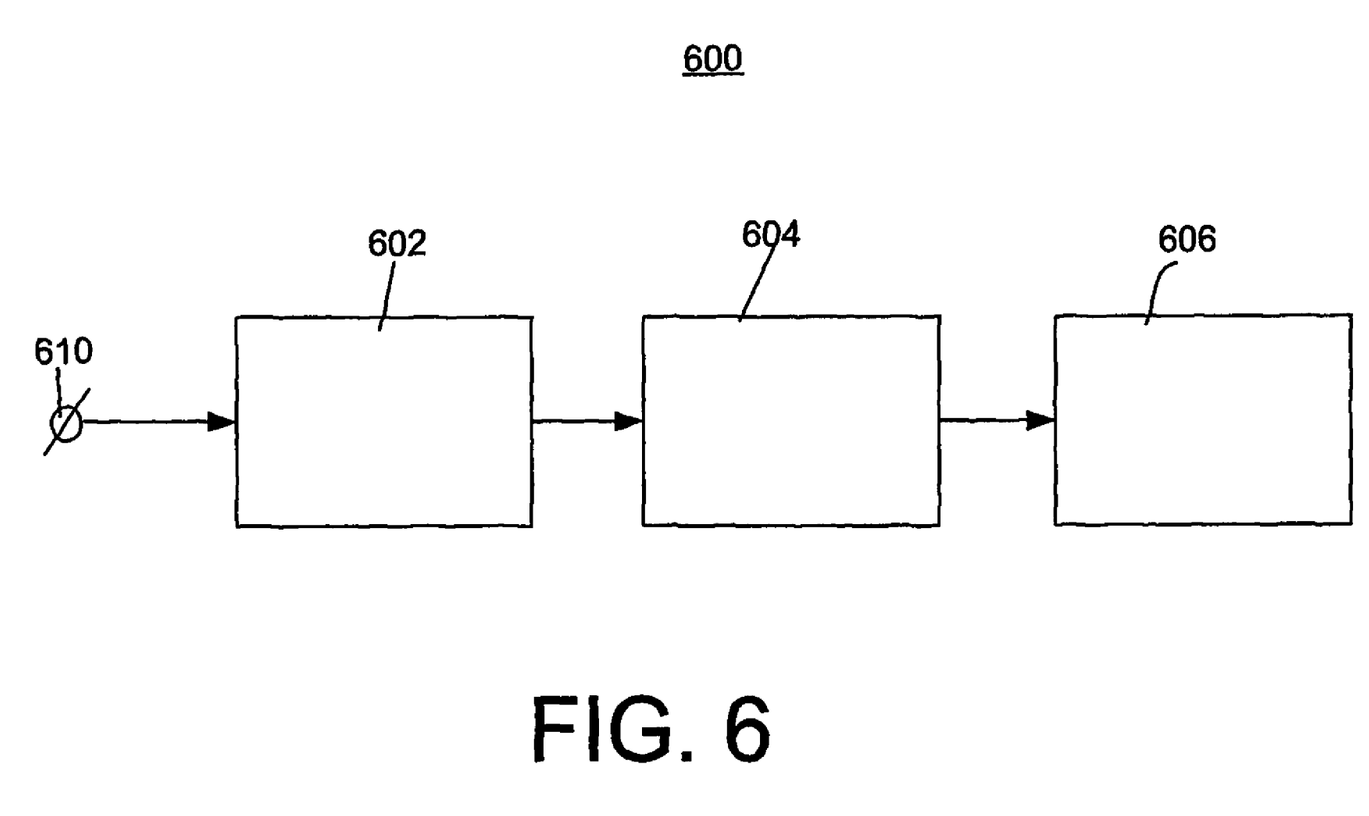
FIG. 6 schematically shows an embodiment of the image processing apparatus according to the invention.

FIG. 6 schematically shows an embodiment of the image processing apparatus 600 according to the invention, comprising:
a receiving unit 602 for receiving a video signal representing input images;
a multi-view image generation unit 604 for generating multi-view images on basis of the received input images, as described in connection with any of the FIGS. 1 and 2; and
a multi-view display device 606 for displaying the multi-view images as provided by the multi-view image generation unit 604.

The video signal may be a broadcast signal received via an antenna or cable but may also be a signal from a storage device like a VCR (Video Cassette Recorder) or Digital Versatile Disk (DVD). The signal is provided at the input connector 610. The image processing apparatus 600 might e.g. be a TV. Alternatively the image processing apparatus 600 does not comprise the optional display device but provides the output images to an apparatus that does comprise a display device 606. Then the image processing apparatus 600 might be e.g. a set top box, a satellite-tuner, a VCR player, a DVD player or recorder. Optionally the image processing apparatus 600 comprises storage means, like a hard-disk or means for storage on removable media, e.g. optical disks. The image processing apparatus 600 might also be a system being applied by a film-studio or broadcaster.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. A multi-view image generation unit (100, 200) for generating a multi-view image on basis of an input image, the generation unit comprising:
   edge detection means (102) for detecting an edge in the input image;
   depth map generation means (104) for generating a depth map for the input image on basis of the edge, by generating
      a first group of elements of the depth map corresponding to the edge having a first depth value, related to a viewer of the multi-view image,
      a second group of elements of the depth map corresponding to a region of the input image, being located adjacent to the edge on a first side, having a second depth value, related to the viewer of the multi-view image, and
      a third group of elements of the depth map corresponding to a region of the input image, being located adjacent to the edge on a second side, having a third depth value, related to the viewer of the multi-view image,
   wherein the first value is less than the second value; and
   rendering means (106) for rendering the multi-view image using the input image and the depth map.

2. A multi-view image generation unit (100) as claimed in claim 1, wherein the edge detection means (102) is arranged to detect the edge by computing pixel value differences between first pixel values of the input image and respective second pixel values of a second input image, the input image and the second input image belonging to a sequence of video images.

3. A multi-view image generation unit (100) as claimed in claim 2, wherein the first pixel values represent one of color and luminance.

4. A multi-view image generation unit (100) as claimed in claim 2, wherein the first depth value is a function of a first one of the pixel value differences.

5. An image processing apparatus (600) comprising:
   receiving means (602) for receiving a signal corresponding to an input image; and
   a multi-view image generation unit (604) for generating a multi-view image on basis of the input image, having
   edge detection means (102) for detecting an edge in the input image;
   depth map generation means (104) for generating a depth map for the input image on basis of the edge, by generating
      a first group of elements of the depth map corresponding to the edge having a first depth value, related to a viewer of the multi-view image,
      a second group of elements of the depth map corresponding to a region of the input image, being located adjacent to the edge on a first side, having a second depth value, related to the viewer of the multi-view image, and
      a third group of elements of the depth map corresponding to a region of the input image, being located adjacent to the edge on a second side, having a third depth value, related to the viewer of the multi-view image,
   wherein the first value is less than the second value; and
   rendering means (106) for rendering the multi-view image using the input image and the depth map.

6. An image processing apparatus (600) as claimed in claim 5, further comprising a multi-view display device (606) for displaying the multi-view image.

7. A method of generating a multi-view image on basis of an input image, the method comprising:
    detecting an edge in the input image;
    generating a depth map for the input image on basis of the edge, by generating
        a first group of elements of the depth map corresponding to the edge having a first depth value, related to a viewer of the multi-view image,
        a second group of elements of the depth map corresponding to a region of the input image, being located adjacent to the edge on a first side, having a second depth value, related to the viewer of the multi-view image, and
        a third group of elements of the depth map corresponding to a region of the input image, being located adjacent to the edge on a second side, having a third depth value, related to the viewer of the multi-view image,
    wherein the first value is less than the second value; and
    rendering the multi-view image using the input image and the depth map.

8. A computer readable storage medium comprising instructions executable by a processor to generate a multi-view image on basis of an input image, the medium comprising:
    code for detecting an edge in the input image;
    code for generating a depth map for the input image on basis of the edge, by generating
        a first group of elements of the depth map corresponding to the edge having a first depth value, related to a viewer of the multi-view image,
        a second group of elements of the depth map corresponding to a region of the input image, being located adjacent to the edge on a first side, having a second depth value, related to the viewer of the multi-view image, and
        a third group of elements of the depth map corresponding to a region of the input image, being located adjacent to the edge on a second side, having a third depth value, related to the viewer of the multi-view image,
    wherein the first value is less than the second value; and
    code for rendering the multi-view image using the input image and the depth map.

* * * * *